(12) United States Patent  (10) Patent No.: US 8,719,531 B2
Strange et al.  (45) Date of Patent: May 6, 2014

(54) SYSTEM AND METHOD FOR PERFORMING DATA RETENTION THAT INCORPORATES ENVIRONMENTAL CONDITIONS

(75) Inventors: John A. Strange, Fort Collins, CO (US); John A. Morrison, Fort Collins, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 343 days.

(21) Appl. No.: 13/159,720

(22) Filed: Jun. 14, 2011

(65) Prior Publication Data

US 2012/0324191 A1 Dec. 20, 2012

(51) Int. Cl.
*G06F 12/00* (2006.01)
*G06F 13/00* (2006.01)
*G06F 13/28* (2006.01)

(52) U.S. Cl.
USPC .................................. 711/165; 711/E12.002

(58) Field of Classification Search
USPC .......................................... 711/165, E12.002
See application file for complete search history.

(56) References Cited

U.S. PATENT DOCUMENTS

| | | | |
|---|---|---|---|
| 4,296,464 A | 10/1981 | Woods et al. | |
| 6,000,006 A * | 12/1999 | Bruce et al. | 711/103 |
| 6,401,214 B1 | 6/2002 | Li | |
| 6,530,034 B1 | 3/2003 | Okada et al. | |
| 6,564,173 B1 | 5/2003 | Arntz et al. | |
| 7,292,490 B1 | 11/2007 | Shu et al. | |
| 7,447,944 B2 | 11/2008 | Hu | |
| 7,464,306 B1 | 12/2008 | Furuhjelm et al. | |
| 7,694,188 B2 | 4/2010 | Raghuraman et al. | |
| 2003/0227451 A1 | 12/2003 | Chang | |
| 2004/0260967 A1 | 12/2004 | Guha et al. | |
| 2005/0044454 A1 | 2/2005 | Moshayedi | |
| 2005/0149570 A1 * | 7/2005 | Sasaki et al. | 707/104.1 |
| 2005/0268062 A1 * | 12/2005 | Nagase et al. | 711/167 |
| 2006/0288153 A1 | 12/2006 | Tanaka et al. | |
| 2007/0124130 A1 | 5/2007 | Brunet et al. | |
| 2007/0159710 A1 | 7/2007 | Lucas et al. | |
| 2007/0180186 A1 | 8/2007 | Cornwell et al. | |
| 2007/0266200 A1 | 11/2007 | Gorobets et al. | |
| 2008/0046766 A1 | 2/2008 | Chieu et al. | |
| 2008/0109591 A1 | 5/2008 | Kim et al. | |
| 2008/0162798 A1 | 7/2008 | Lofgren et al. | |
| 2008/0229003 A1 | 9/2008 | Mizushima et al. | |
| 2009/0063895 A1 | 3/2009 | Smith | |
| 2010/0011260 A1 | 1/2010 | Nagadomi et al. | |
| 2010/0257430 A1 | 10/2010 | Chen | |

OTHER PUBLICATIONS

SFF Committee Specification, "Self-Monitoring, Analysis and Reporting Technology (SMART) SFF-8035i Revision 2.0", Apr. 1, 1996.

* cited by examiner

*Primary Examiner* — Sheng-Jen Tsai

(57) ABSTRACT

A solid-state storage system is described with a method for adjusting the frequency of data retention operations. The data retention operation frequency can be increased or decreased according to a variety of environmental factors such as error code frequency, system temperature, altitude, and other operating conditions. These factors can indicate an increased or decreased risk of failure and accordingly provide increased or decreased rates of data retention operations.

20 Claims, 5 Drawing Sheets

SYSTEM AND METHOD FOR PERFORMING DATA RETENTION THAT INCORPORATES ENVIRONMENTAL CONDITIONS

BACKGROUND

1. Technical Field

This disclosure relates to solid-state storage systems. In particular, this disclosure relates to a system and method for performing data retention for solid-state storage systems prone to eventual data loss.

2. Description of Related Art

Solid-state storage systems typically store memory in a variety of memory storage array technologies. These storage arrays can be susceptible to data loss if data is stored for substantial periods of time at a physical storage location. To ensure data retention, data is sometimes relocated to a new physical storage location according to a schedule based on a manufacturer's recommendation.

BRIEF DESCRIPTION OF THE DRAWINGS

Systems and methods which embody the various features of the invention will now be described with reference to the following drawings, in which.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

System Overview

Embodiments of the invention are directed to systems and methods for adjusting a manufacturer's maintenance period. In typical storage systems, solid-state storage arrays include a risk of data loss if data is stored in the same physical location for long periods of time. As a result, manufacturers typically suggest a maintenance period for occasionally relocating data on the solid-state storage drive. This relocation reads and re-writes the data from the storage array to a new physical location on the storage array. There are deficiencies to following a manufacturer's recommended maintenance period. For example, if maintenance (i.e. data relocation) is performed too frequently, the solid-state device will be performing maintenance instead of other control tasks or memory accesses related to host needs. In addition, a conservative manufacturer may recommend maintenance more frequently than it is actually needed. Maintenance performed too frequently may also cause unnecessary read/write operations and needlessly increase the read/write cycles on a drive. Likewise, maintenance performed too infrequently can risk data loss. This disclosure provides techniques for tuning a maintenance period according to the actual operational conditions of the solid-state storage system.

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Figure 1:
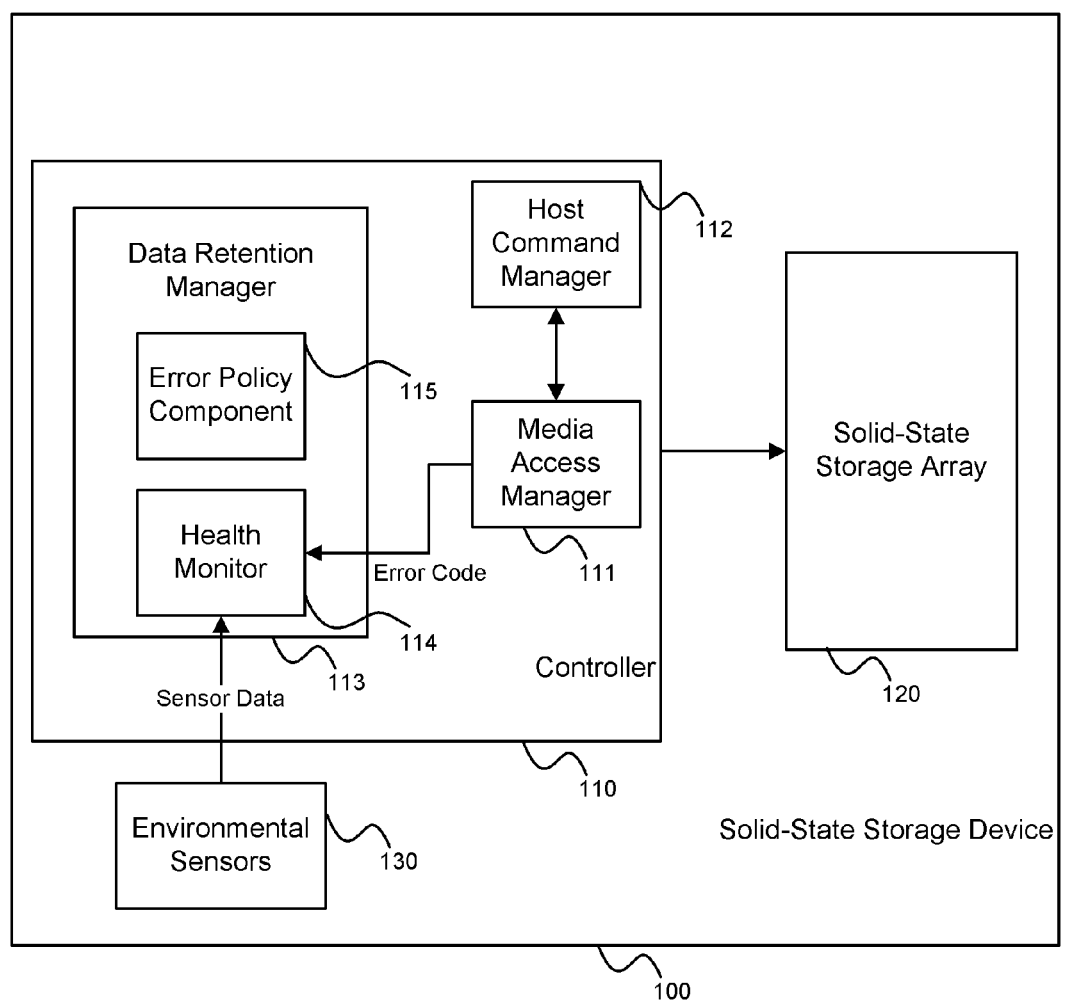
FIG. 1 illustrates a solid-state storage device according to an embodiment.

Referring to FIG. 1, a solid-state storage device is shown according to an embodiment. According to this embodiment, a non-volatile storage device 100 may include a controller 110, a solid-state storage array 120, and environmental sensors 130. The controller 110 may correspond to a processor or group of processors, and may be implemented in hardware, in part or in whole. The controller 110 is responsible for receiving and responding to host requests and accessing the solid-state storage array 120. The controller can manage and process host commands through a host command manger 112. The controller in an embodiment includes a media access manager 111 that issues media access commands to the solid-state storage array 120.

In this embodiment, a data retention manager 113 controls policies and data retention behavior of the solid-state storage device 100. The data retention manager 113 can include a health monitor 114 which monitors data indicative of the likelihood of data loss on the solid-state storage array 120. For example, the health monitor 114 can receive error codes from the media access manager 111 such as Error Correcting Codes (ECC) that are based on errors encountered during a memory access operation. Environmental data may also be received by the health monitor 114 from the environmental sensors 130. For example, the environmental sensors 130 can include a temperature sensor, an altimeter, and other sensors/instrumentations that measure operating conditions. The data retention manager may also include an error policy component 115 which can include procedures to determine whether to query the solid-state storage array to determine whether to execute data retention procedures. For example, the error policy component 115 can initiate a read command from the media access manager 111 to determine if any error codes are generated by the read command. As further detailed below, the data retention manager 113 can use the sensor data and error code data to adjust the rate of data relocation performed on the solid-state storage array 120.

Manufacturer's Maintenance Period

Figure 2:
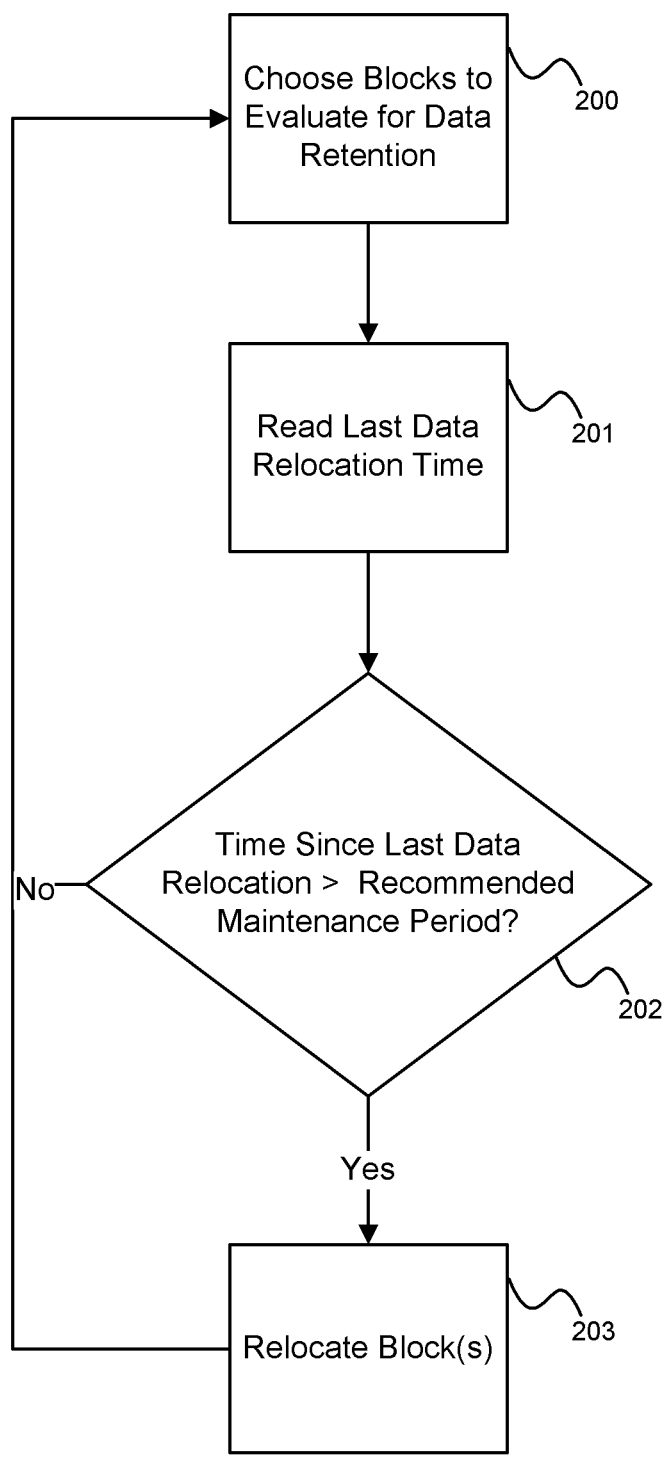
FIG. 2 illustrates a process for data retention using a manufacturer's recommended maintenance period.

Referring to FIG. 2, a flowchart is shown for data relocation performed in accordance with a manufacturer's recommended period according to an embodiment. The process shown in FIG. 2 can be performed, for example, by the controller 110 and/or the data retention manager 113. At block 200, the controller chooses a series of blocks to evaluate for data retention. At block 201, the controller reads the last time the data was written or relocated in these blocks. At block 202, the time the data was written or relocated is compared against the recommended manufacturer's maintenance period. The manufacturer's maintenance period may be a static value (e.g. once per every six months) or may be dynamic according to a maintenance curve (e.g. increasing in frequency according to the age of the solid-state storage drive). At block 202, a determination is made whether the data requires relocation based on whether the time elapsed since the data was last relocated/written is longer than the manufacturer's recommended maintenance period. If the block(s) have not been relocated/written within the manufacturer's recommended period, the block(s) are relocated at block 203. The process can then determine new bocks to evaluate at block 200.

Maintenance Factor

Figure 3:
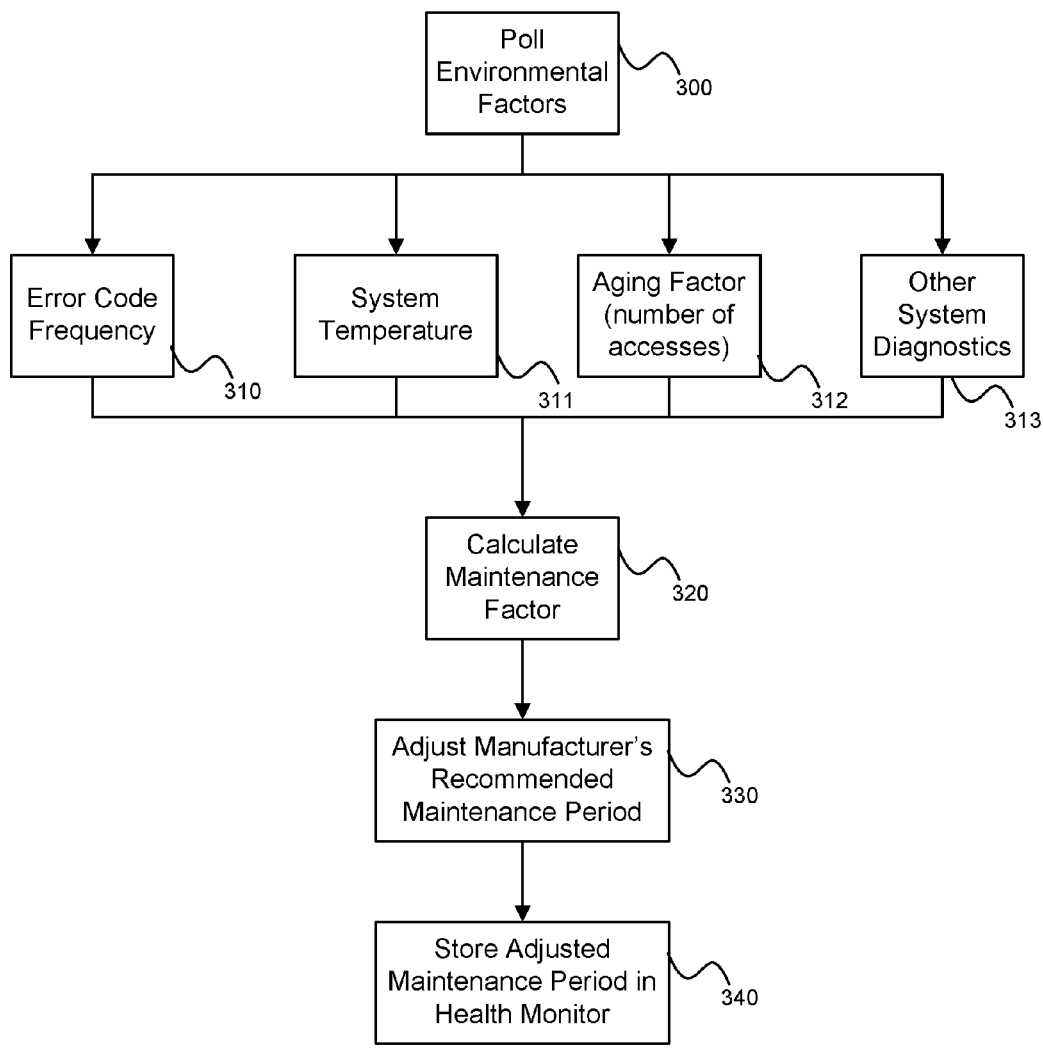
FIG. 3 illustrates a process for calculating and storing an adjusted maintenance period according to an embodiment.

Referring now to FIG. 3, FIG. 3 shows the calculation of an adjusted maintenance period according to an embodiment. The adjusted maintenance period can provide an alternate rate of data retention to using the manufacturer's recommended period. The method of FIG. 3 can be performed, for example, by the controller 110 and/or the data retention manager 113 shown in FIG. 1. At block 300, the environmental factors can be polled to determine factors for determining a maintenance period. These environmental factors can include a variety of metrics. For example, it can include an error code frequency 310, a system temperature 311, an aging factor 312, and other system diagnostics 313 (e.g. operating altitude, power management parameters, and clock rates). The aging factor 312 may reflect the number of memory accesses (e.g. read, write, erase) executed on individual storage elements such as blocks on the non-volatile storage array, and can include a determination of whether there are more or less memory accesses compared to the number of memory accesses expected for the individual storage elements on the non-volatile storage array for the time period.

At block 320, a maintenance factor can be calculated based on the environmental factors collected. The maintenance factor can indicate whether the memory array is expected to be more or less likely to be at risk of data loss. For example, the maintenance factor may reflect increased risk of loss if the error code frequency 310 is higher than expected, the system temperature 311 is higher than a typical operating temperature (or outside of the manufacturer's recommended range), the aging factor reflects a high number of accesses, and/or other system diagnostics reflecting a heightened risk of data loss. Conversely, a maintenance factor reflecting reduced risk of loss may be calculated if the error code frequency is low, system temperatures are low, and/or other factors suggest a reduced risk of loss.

At block 330, by using the maintenance factor calculated at block 320, the manufacturer's recommended maintenance period can be adjusted to calculate an adjusted maintenance period. This adjusted maintenance period can take into account the environmental indicators of risk of data loss as polled above. As such, this adjusted maintenance period can account for the actual risk of data risk without relying exclusively on the manufacturer's recommendation. In addition, the adjustment step in block 330 can include an accommodation for a performance/reliability factor. This performance/reliability factor can be user-adjusted or factory determined to further determine the aggressiveness of the data relocation policy. For example, for very sensitive data, the performance/reliability factor may be modified to increase the data reliability to reduce the risk of data loss by increasing the rate of data relocation, while a user who is particularly sensitive to data responsiveness and performance may modify the performance/reliability factor to decrease the data relocation frequency. In addition, a user may specify the performance/reliability factor so that a portion of the storage device that stores important data (e.g., operating system files) is relocated more frequently to prevent data loss and/or another portion storing frequency changed/accessed user data is relocated less frequently. The adjusted maintenance period can be stored in the health monitor in block 340 for future reference in determining how frequently to relocate blocks and/or whether to relocate data blocks at particular points in time. An adjusted maintenance period may be stored for individual data blocks or groups of blocks (or other storage elements such as pages), or a single maintenance period may be calculated for the data array as a whole.

Adjusted Maintenance Periods

Figure 4:
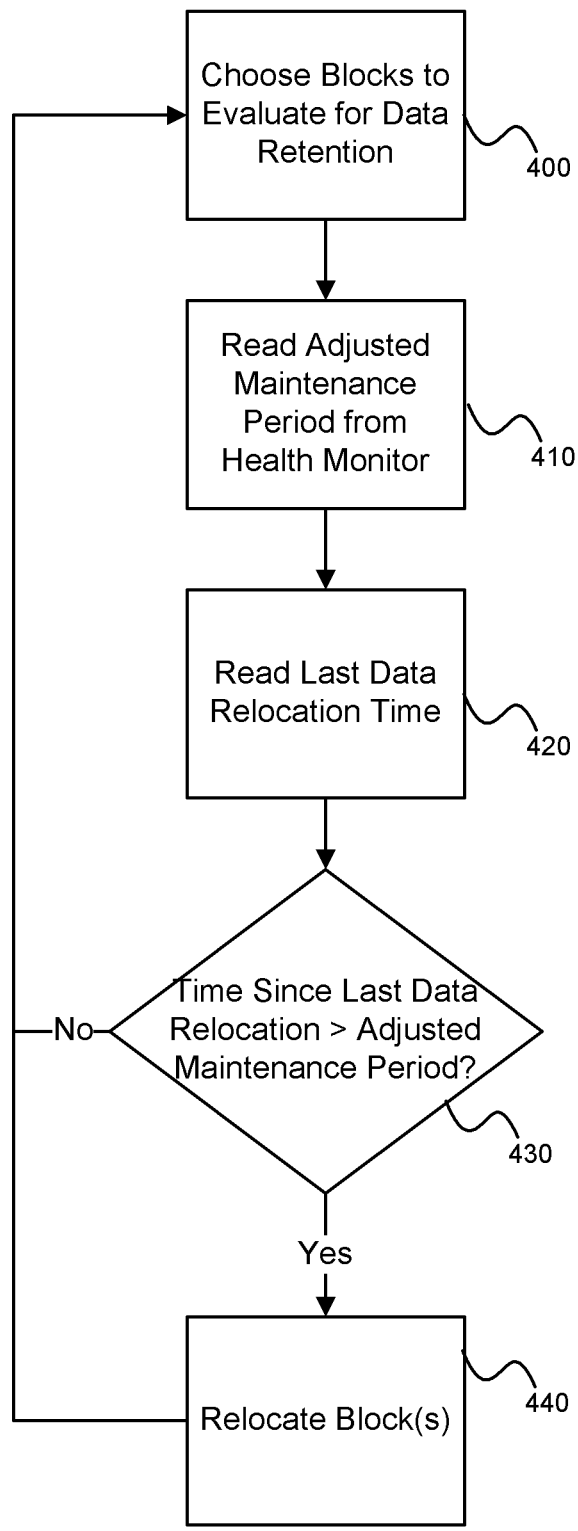
FIG. 4 illustrates a process for data retention using an adjusted maintenance period according to an embodiment.

Referring now to FIG. 4, a data retention process is shown according to an embodiment. In this embodiment, the adjusted maintenance period is taken into account in determining whether to relocate the data. This process may be performed by the controller 110 and/or the data retention manager 113 of the non-volatile storage system 100. At block 400, a block or collection of blocks are chosen for evaluation for data retention as in FIG. 2. At block 410, the adjusted maintenance period associated with the block(s) is read from the health monitor. In an embodiment, the adjusted maintenance period may be determined as shown in FIG. 3. At block 420, the last time data was written or relocated is read. A comparison is made at block 430 to determine if the data has been written or relocated within the time designated by the adjusted maintenance period. If the data needs relocation, the data is relocated at block 440.

In this manner, the data retention process may be tailored to the actual conditions of the storage device. For example, if a storage device has a manufacturer's recommended maintenance period of every 6 months, according to this embodiment, blocks of data within the storage device may be initially relocated every 9 to 12 months in the first 1-2 years of overall operation. During this time period, because of the reduced frequency of data relocation, the overall device performance is improved vis-à-vis following the manufacturer's recommended maintenance period. Then, as the storage device ages and access errors increase, the maintenance period may be adjusted so that data is relocated every 3 or 4 months. As another example, data in the same storage device may be relocated every 3 or 4 months from the very beginning if it is detected that the device is constantly being operated at a temperature and/or altitude that increase risk of data loss.

Data Retention Manager

Figure 5:
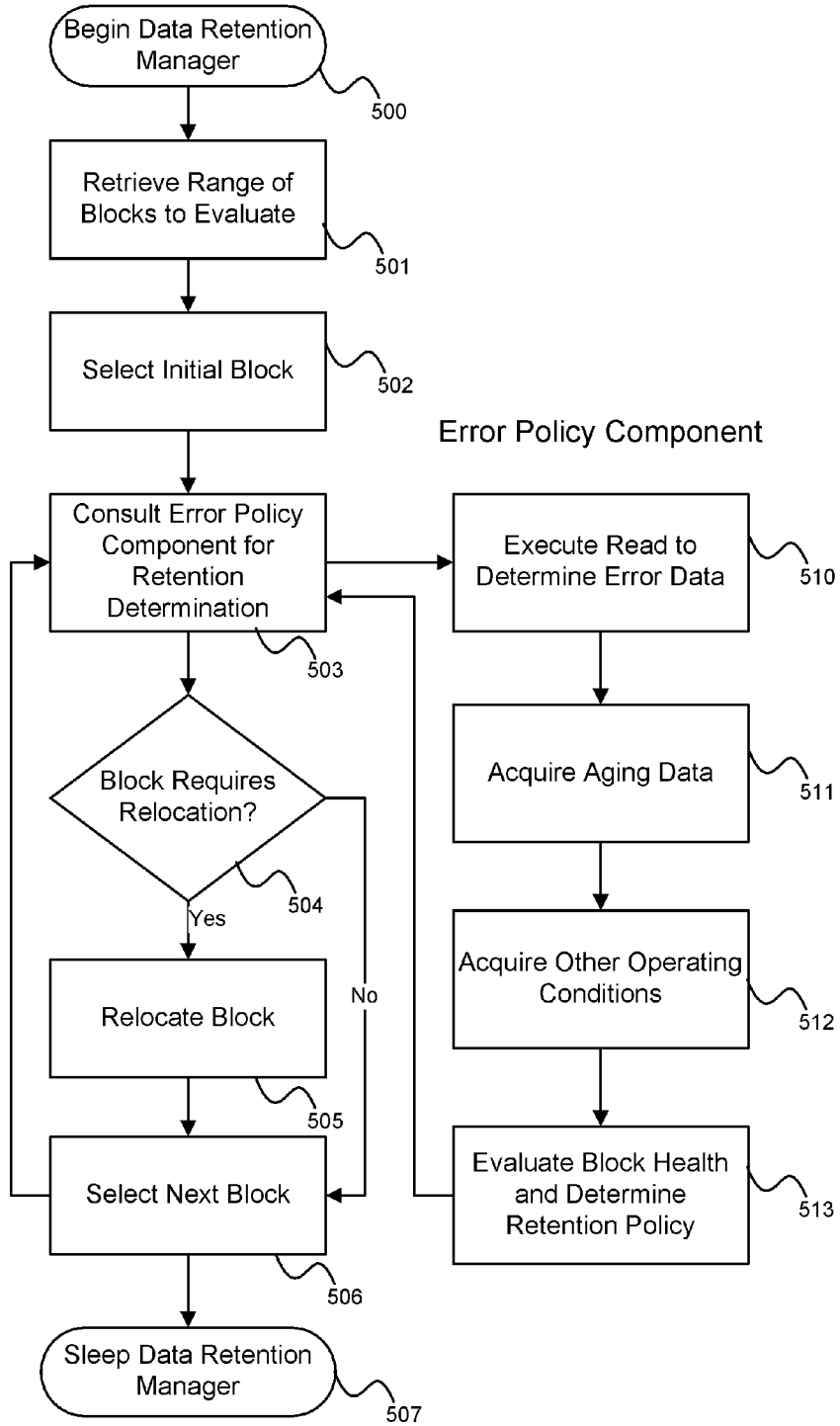
FIG. 5 provides a flowchart for a process performed by a data retention manager according to an embodiment.

Referring now to FIG. 5, an embodiment of a data relocation manager is shown. In this embodiment, the data relocation manager is a process which is executed to relocate data in blocks to guard against data loss, and may be performed by the controller 110, the data retention manager 113, and/or the error policy component 115 of the non-volatile storage system 100. In the embodiment shown by FIG. 5, the data retention manager manages data loss on a block-by-block basis, but other granularities are possible. At block 500, the data retention manager begins. In the embodiment contemplated here, the data retention manager is executed at intervals, and will be started and stopped according to estimated need for assessing data retention. The estimated need for assessing data retention may be calculated in part based on the environmental factors, or may be determined by other means. At block 501, a range of blocks is selected to evaluate for data retention. At block 502, an initial block is selected for evaluation. At block 503, the error policy component (e.g. the error policy component 115 shown in FIG. 1) is consulted to determine whether to perform a data retention relocation.

At block 510, for the particular block, a read may be executed on the block to determine if a read generates error data. Next, aging data can be compiled and consulted at block 511 to determine the number of memory accesses already performed on the storage array and/or the block in particular. At block 512, other environmental/operating conditions may be analyzed, such as the temperature, operating altitude, frequency of data errors, and other factors as discussed throughout this disclosure. At block 513, the block health is determined along with a determination of whether to relocate the block. For example, the particular block may have experienced 1,000 cumulative erase cycles while the expected number at this point in time is 800. In addition, the operating temperature of the storage device may be 5 degrees above the maximum. Such data points tend to indicate that the block is at a higher risk of data loss and a relocation may be more urgently needed. In some embodiments, the data acquired in blocks 511 and 512 may already be stored in a health status monitor, which may periodically collect such data in background operations. In addition, while this Figure depicts blocks 510 through 513 as performed in part or in whole by of an error policy component, these steps may be performed in another order or by another component to determine whether to relocate a block.

At block 504, if the block requires relocation, the block will be relocated at block 505. If the block does not require relocation, the next block is selected at block 506. The next block can then be evaluated at block 503. If there are no further blocks in the range of block selected at block 501, the data retention manager sleeps at block 507. In this embodiment, the data retention manager can calculate a period of time to sleep until waking to re-evaluate the data retention of a range of blocks. This calculation can be used to determine how long to sleep the data retention manager and may be based on the adjusted maintenance period as discussed above. In other embodiment, the sleep period may be set to a constant.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 2, 3, 4, and 5 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of data retention in a storage system, comprising:
    storing data in a solid-state storage array of the storage system in response to commands received by the storage system from a host system, the solid-state storage array susceptible to data loss in the absence of periodic data relocation;
    receiving or determining parameters indicative of a risk of data loss;
    dynamically determining a data relocation rate, the determining comprising adjusting a manufacturer's recommended relocation rate based at least in part on the parameters indicative of the risk of data loss; and
    relocating the data on the solid-state storage array at the determined data relocation rate,
    wherein the method is performed by a controller of the storage system.

2. The method of claim 1, wherein the parameters include at least one of an error code rate, a temperature of the storage system, an operating altitude, and a number of data accesses to the storage array.

3. The method of claim 1, wherein the manufacturer's recommended rate comprises a data retention frequency curve.

4. The method of claim 1, wherein the dynamically determined data relocation rate is higher than the manufacturer's recommended rate when the parameters indicative of a risk of data loss indicate a higher risk of data loss.

5. The method of claim 1 wherein the dynamically determined data relocation rate is lower than the manufacturer's recommended rate when the parameters indicative of a risk of data loss indicate a lower risk of data loss.

6. A non-volatile storage system, comprising:
    a solid-state memory array configured to store data, the solid-state memory array susceptible to long-term storage data loss; and
    a controller configured to mitigate long-term data loss in the solid-state memory array by periodically relocating data in the solid-state memory array;
    the controller further configured to:
        receive or determine data indicative of a likelihood of data loss of the solid-state memory array;
        process the data indicative of the likelihood of data loss to determine a maintenance factor;
        adjust a manufacturer's recommended maintenance period based at least partly on the maintenance factor to determine a maintenance period; and
        periodically relocate data in the solid-state memory array at a rate which depends upon the maintenance period.

7. The storage system of claim 6, wherein the controller is further configured to periodically receive data indicative of a likelihood of data loss, process the data indicative of the likelihood of data loss to determine the maintenance factor, and adjust the manufacturer's recommended maintenance period based at least partly on the maintenance factor to determine the maintenance period.

8. The storage system of claim 6, wherein the data indicative of a likelihood of data loss comprises at least one of an error rate, a temperature, an operational altitude, and a usage frequency.

9. The storage system of claim 8, wherein the error rate is obtained from read operations performed by the controller on data stored in the solid-state memory array, the read operations being performed in response to a command from a host system.

10. The storage system of claim 8, wherein the error rate is obtained from periodic read operations performed by the controller on data stored in the solid-state memory array, the periodic read operations not being performed in response to a command from a host system.

11. A method for reducing data loss in a storage system, the method comprising:
    storing data in a plurality of storage elements in a solid-state storage array;
    receiving data related to operational conditions indicative of a risk of data loss;
    dynamically determining a data relocation rate, the determining comprising adjusting a manufacturer's recommended relocation rate based at least in part on the data related to operational conditions indicative of the risk of data loss; and
    for one or more of the plurality of storage elements,
        periodically relocating, at the determined data relocation rate, the data stored in the one or more storage elements,
        wherein relocation of the data at least partly mitigates a risk of data loss due to the data being stored in the solid-state storage array for an extended time period.

12. The method of claim 11, wherein the frequency at which the determining and relocating are performed is determined at least in part by the operational conditions indicative of a risk of data loss.

13. The method of claim 11, wherein each of the storage elements is a block.

14. The method of claim 11, wherein the operational conditions comprise at least one of an error code quantity, a temperature of the storage system, an operating altitude, and a number of data accesses to the storage array.

15. The method of claim 1, further comprising:
    dynamically determining a plurality of data relocation rates corresponding to a plurality of data sets stored in the solid-state storage array; and
    relocating each of the plurality of data sets at the corresponding data relocation rate.

16. The method of claim 1, wherein dynamically determining the data relocation rate further comprises adjusting the manufacturer's recommended relocation rate based at least in part on the parameters indicative of the risk of data loss and on a relative importance of the stored data.

17. The storage system of claim 6, wherein the controller is further configured to:
    determine a plurality of maintenance periods corresponding to a plurality of data sets stored in the solid-state memory array; and
    periodically relocate each of the plurality of data sets in the solid-state memory array at a rate which depends on the corresponding maintenance period.

18. The storage system of claim 6, wherein the controller is further configured to determine the maintenance period based at least partly on the adjusted manufacturer's recommended maintenance period and on a relative importance of the stored data.

19. The method of claim 11, further comprising:
    dynamically determining a plurality of data relocation rates corresponding to a plurality of data sets stored in the solid-state storage array; and
    periodically relocating each of the plurality of data sets at the corresponding data relocation rate.

20. The method of claim 11, wherein dynamically determining the data relocation rate further comprises adjusting the manufacturer's recommended relocation rate based at least in part on the data related to operational conditions indicative of the risk of data loss and on a relative importance of the stored data.

* * * * *